Jan. 11, 1966 T. A. CROFT 3,228,577
LIQUID CARRIER
Filed Dec. 26, 1962
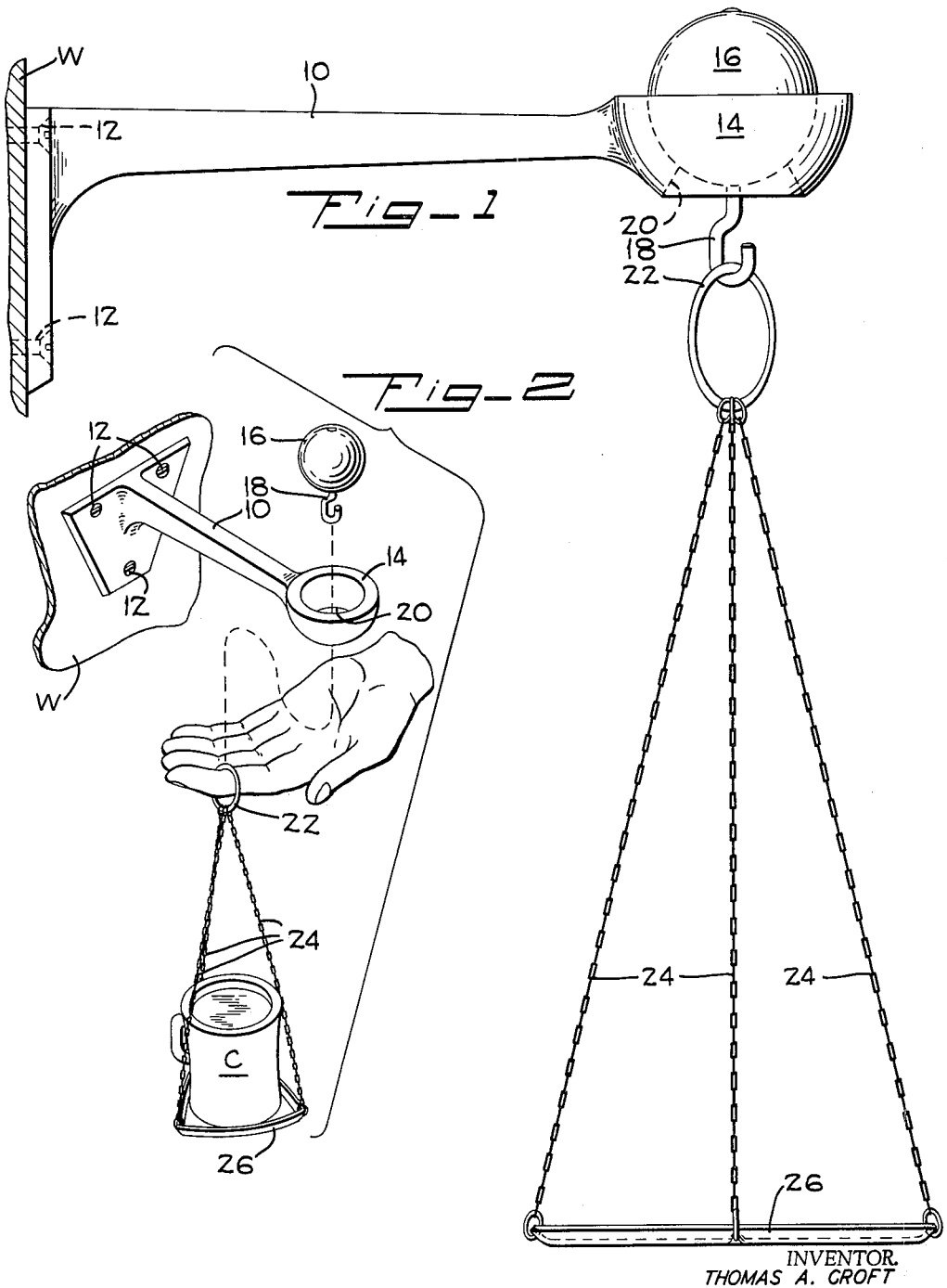
INVENTOR.
THOMAS A. CROFT
BY
Paul B. Fike
PATENT AGENT United States Patent Office 3,228,577
Patented Jan. 11, 1966

3,228,577
LIQUID CARRIER
Thomas A. Croft, East Palo Alto, Calif., assignor of twenty-five percent to Paul B. Fihe, San Jose, Calif.
Filed Dec. 26, 1962, Ser. No. 247,131
2 Claims. (Cl. 224—42.46)

The present invention relates generally to article carriers, and more particularly, to carriers for liquid arranged to substantially preclude spillage thereof.

Anyone who has carried a bucket of water or a cup filled with coffee is aware of the severe tendency of the liquid to spill. A similar spillage tendency exists when liquid-filled cups or other containers are carried in automobiles, airplanes, boats, and the like, wherein random motions and consequent forces on the liquid are experienced.

Accordingly, it is a general object of the present invention to provide a liquid carrier arranged to enable the transportation of liquid without spillage during motion experienced in hand carrying, or alternatively, during carrying on a vehicle subject to random or haphazard motion.

More particularly, it is a feature of the invention to provide a liquid carrier in the form of a pendulum-like suspension structure arranged so that the center of percussion of the pendulum so formed is within the volume of liquid being carried.

Additionally, it is a feature of the invention to provide a pendulum-like carrier for liquids wherein the distance between the center of percussion and the pivot point of the pendulum is substantially greater than any single dimension of the liquid carried thereby.

Another feature of the invention relates to the incorporation of means for damping oscillations of the pendulum-like carrier structure.

More specifically, it is a feature of the invention to provide a carrier for a coffee cup or other open liquid receptacle including a tray member on which a receptacle may be seated and a plurality of suspension members attached to such tray.

A related, specific feature of the invention is the precise design of such tray and the suspension members so as to minimize their weight relative to that of a filled receptacle carried thereby wherefore ultimately the center of percussion of the formed pendulum structure is located within the liquid receptacle.

A further related feature is the design of the suspension members so that they are flexible but are not stretchable wherefore the entire structure can partake of swinging motion but is precluded from vertical oscillation.

Such flexibility of the suspension members provides another feature of the invention in that such flexible members can collapse to reduce the storage volume required for the carrier unit and furthermore permit the tray to function after the fashion of a conventional "coaster" for the liquid receptacle.

A further and somewhat related feature of the invention is the precise design of the tray and the associated suspension members proportionally to the receptacle that is to be carried thereby so that the suspension members are adapted to engage the upper rim of the receptacle when the latter is seated on the tray.

Yet a further feature of the invention is the separate connection of the flexible suspension members to a single handle in a manner providing substantially a frictionless pivot for the suspension members and the tray and simultaneously facilitating the reorientation of the flexible suspension members in the event that they become entangled.

Yet a further specific feature of the invention is the suspension of the aforementioned handle removably on an additional pivot which incorporates a predetermined amount of friction and thus damps oscillations of the structure when suspended therefrom.

These as well as other objects and features of the invention will become more apparent from the following description of the structure illustrated in the accompanying drawing wherein:

FIG. 1 is a side elevational view of an exemplary carrier structure embodying the present invention and adapted for mounting on a boat, automobile, or other vehicle wherein haphazard motions are experienced, and FIG. 2 is a perspective view on a smaller scale of the FIG. 1 structure with elements thereof separated so that the liquid carrier can be manually transported.

The illustrated structure includes a bracket 10 which may be conventionally attached to a partition or wall W in an automobile, boat, or elsewhere by suitable screws 12 so that the bracket projects substantially horizontally therefrom. At its outer end, the bracket 10 is formed with a hemispherical or cup-shaped socket 14 within which a ball 16 can be received for rotatable support. The socket 14 and ball 16 are formed from materials so that a predetermined amount of friction is experienced wherefore the structure can be termed a frictional pivot.

A hook 18 is integrally attached to the ball 16 and is arranged to project downwardly through an enlarged aperture 20 in the bottom of the hemispherical socket 14. The hook 18, in turn, is arranged to carry a ring 22 to which are separately attached three flexible chains 24 of relatively lightweight material. The chains 24, in turn, extend downwardly from the ring 22 in a pyramid-like configuration for connection at their lower ends to the respective corners of a generally triangularly-shaped tray 26 that is also of lightweight material and forms what may be considered the base of the pyramid. Preferably, as illustrated, the outer edges of the tray 26 are bent upwardly a slight amount to form a perimetric rim.

As mentioned, the chains 24 are separately attached to the ring 22. They are also slidable on the circular ring 22 wherefore if the chains, by some chance, become twisted, a simple pulling on the chains effects automatic turning of the ring and appropriate sliding of the chains thereon until they are disentangled.

As illustrated in FIG. 2, the tray 26 is dimensioned to receive a cup C or other receptacle of predetermined size so that the upwardly extending flexible chains 24 engage the rim of the cup. Such dimension of the tray 26 and the associated suspension chains 24 facilitates placement of the cup C on the tray in that the cup can be inserted between the chains at a position somewhat above the tray and thereafter lowered. During such lowering, the chains 24 engage the rim of the cup C and thus function to automatically center the tray 26 under the cup as it is lowered so that when the cup finally comes into engagement with the tray, it is precisely centered thereon.

Additionally, for a purpose to become more apparent hereinafter, the length of each of the suspension chains 24 is substantially greater than any dimension of the cup C, or more particularly, the liquid contents thereof, and it is preferred that this dimensional relationship be at least in a ratio of two to one.

When a filled cup C of liquid has been seated on the tray 26 in the fashion described, the ring 22 can be manually grasped and removed from the hook 18 to thereafter function as the handle for the manual transportation of the carrier with the cup thereon, as illustrated in FIG. 2. During such manual transportation, the carrier and the cup C carried thereby will swing in a pendulum-like fashion, but, in accordance with the present invention as embodied in the described structure, no liquid will spill from the cup even though the latter be substantially brimfull. This result may be explained as follows. A substantially frictionless pivot is provided at the point where the flexible chains 24 engage the ring 22 and because the chains 24 and the tray 26 are relatively lightweight, as compared to the weight of the cup and the liquid contained therein, the center of percussion of the formed pendulum is located within the volume of the liquid itself. It is well known from basic physics that a simple pendulum, that is, a pendulum with a concentrated mass suspended from a massless string, has the particular characteristic that regardless of the instantaneous pendulous position of the concentrated mass, the force thereon will always be directed toward the point of pivotal support of the massless suspending string. In more simple terminology, "up" is always toward this pivot point, and if the concentrated mass includes liquid, such liquid will remain quiescent in its container just as if the entire suspension structure were at rest.

The point at which the described "up" force acts on the concentrated mass is the mentioned center of percussion and this point will move towards the pivot point when an actual pendulum is constructed since it is obviously impossible to build the theoretically described simple pendulum. However, if as in the present design, the chains 24 and the tray 26 are relatively lightweight, the relatively great weight of the cup and contained liquid provides a close approximation to a simple pendulum and automatically assures that the center of percussion of the pendulum so formed lies within the liquid contents. Accordingly, regardless of the swinging motion of the described carrier with the cup C resting thereon, substantially no forces tending to move the liquid are experienced, and as an ultimate result, spilling of the liquid is substantially precluded.

It should be observed that even though the center of percussion be located at some point within the liquid contents of the cup C, at any other point above or below, or for that matter, to the side of such center of percussion, forces do exist which will tend to swirl the liquid and possibly result in spillage unless, in accordance with an additional aspect of the present invention, the suspending chains 24 are made relatively long with respect to the largest dimension of the liquid contents. If, for example, the suspending chains 24 were of infinite length, no forces whatsoever would act to move the liquid contents of the cup. As a practical matter, it has been found that if the length of each suspending chain 24 is made at least two times that of the largest liquid dimension, the forces on the liquid at points other than the center of percussion are reduced to an amount such that liquid motion is substantially negligible and actual spillage is effectively precluded.

Additionally, it is to be observed that while certain advantages are derived from the use of the flexible suspending chains 24, these suspension members can be rigid structures so long as the length, weight and general arrangement is substantially as described. However, it is to be expressly noted that the suspension members can not be stretchable, for in that event, vertical oscillation of the tray 26 and the cup C thereon would be permitted, motion other than simple pendulum motion would be enabled, and spilling of the liquid could and would occur.

When the ring 22 is placed over the hook 18 supported from the bracket 10, the carrier will again partake of pendulum motion when various motions of the vehicle impart forces thereto. As such vehicle movements continue, it is indeed possible that the oscillatory pendulum movement of the carrier, unless restrained, might continually increase until an adjoining structure were encountered by the tray 26 to then effect spilling of the liquid and actual displacement of the cup C from its seat on the tray. Accordingly, in accordance with an additional aspect of the present invention, means are provided to damp the oscillations without, however, adversely affecting the simple pendulum motion of the carrier. Such damping means can take many varied forms. As here illustrated, the friction pivot provided by the ball 16 within the hemispherical socket 14 serves this function, and moreover, has been found to be extremely effective in practice in that the carrier and the cup C thereon is brought to a quiescent, suspended position relatively rapidly after swinging forces are no longer encountered.

Obviously, other damping means can be substituted for that described, and many other variations and modifications can be made in the described structure without departing from the spirit of the invention. Accordingly, the structure as described hereinabove is to be considered as purely exemplary and not in a limiting sense; and the actual scope of this invention is to be indicated only by reference to the appended claims.

What is claimed is:

1. A carrier for a liquid receptacle, means for mounting said receptacle from a vehicle, said means comprising a mounting bracket, a friction pivot member supported on said bracket for universal pivotal movement with a predetermined resistance to such movement, a second pivot member having less friction suspended from said friction pivot member, and a tray suspended from said second pivot member and adapted to carry a liquid receptacle thereon.

2. A carrier for a liquid receptacle, means for mounting said receptacle from a vehicle, said means comprising a mounting bracket, a friction pivot member supported on said bracket for universal pivotal movement with a predetermined resistance to such movement, a second pivot member having less friction suspended from said friction pivot member, and means suspended from said second pivot member and adapted to carry a liquid receptacle.

References Cited by the Examiner

UNITED STATES PATENTS

| | | | |
|---|---|---|---|
| 778,786 | 12/1904 | Kramer | 248—318 |
| 941,448 | 11/1909 | Hagluno | 248—318 |
| 2,352,024 | 6/1944 | Sebestyen | 114—193 |

GERALD M. FORLENZA, *Primary Examiner.*

HUGO O. SCHULZ, *Examiner.*